United States Patent Office 3,337,588
Patented Aug. 22, 1967

3,337,588
POLYMERIZABLE MATERIAL
Henry M. Walton and David S. Cobbledick, Decatur, Ill., assignors to A. E. Staley Manufacturing Company, Decatur, Ill., a corporation of Delaware
No Drawing. Filed June 10, 1963, Ser. No. 286,492
38 Claims. (Cl. 260—347.4)

This invention relates to polymerizable vicinal acyloxy-halo, long-chain aliphatic compounds and to the process of preparing such compounds wherein a long-chain ethylenically unsaturated compound, an acid acrylic compound and a hypohalite are reacted to introduce in one reaction a halogen and an acyloxy group on adjacent carbon atoms. More specifically, this invention relates to an improvement in the above haloacylation reaction which comprises reacting a long-chain ethylenically unsaturated compound with hypohalite and ester of polyhydroxy component and dicarboxylic acid component wherein said ester has on an average (1) at least one free carboxyl group, (2) at least two intra-ester linkages in the ester chain and (3) a molecular weight of at least 206.

In commonly assigned application Ser. Nos. 167,153, now U.S. Patent 3,255,133, and 167,154, now U.S. Patent 3,304,315, both filed Jan. 18, 1962, there are disclosed a series of long-chain vicinal acryloxy-halo compounds having the structure (A)
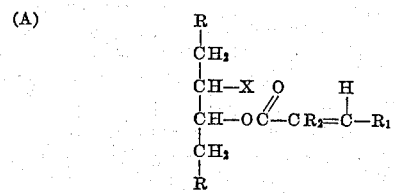

wherein

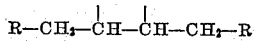

is an aliphatic open chain of from 10–24 carbon atoms; R is hydrogen or a monovalent aliphatic group; $R_1$ is hydrogen or

when $R_1$ is hydrogen, $R_2$ is hydrogen, alkyl of from 1 to 4 carbon atoms, halogen, phenyl, benzyl, or

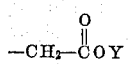

when $R_1$ is

$R_2$ is hydrogen, halogen or alkyl of from 1 to 4 carbon atoms; Y is an aliphatic or aromatic monovalent radical and X is halogen. As pointed out in U.S. Patent 3,255,133, the preferred method for preparing these compounds comprises reacting an acid acrylic compound, an alkyl hypohalite and a long chain ethylenically unsaturated compound. For example:

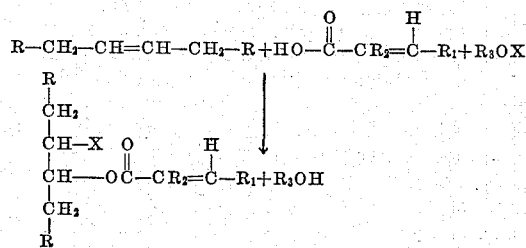

wherein R, $R_1$, $R_2$ and X are as defined above and $R_3$ is alkyl.

The above reaction also yields in minor proportions, by-products which may be represented as follows, the notation being the same as before:

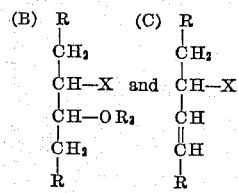

As indicated in application Ser. No. 167,154, now U.S. Patent 3,304,315, a typical distribution (approximate) of the products in the above reaction mixture is as follows: 65 mole percent acryloxy-halo derivative, 15 mole percent alkoxy-halo derivative (B) and 20 mole percent allylic-halo derivative (C). If the alkyl hypohalite in the above equation is replaced by in situ generated hypohalite formed by the reaction of aqueous alkali and diatomic halogen, $R_3$ in the above equation is hydrogen.

It has now been found that the allylic-halo derivative (C) inhibits the copolymerization of esters of alpha,beta-ethylenically unsaturated alpha,beta-dicarboxylic acids (half-esters and/or diesters) with copolymerizable vinylidene monomers. For example, a typical cross-linking fumaryloxy-halo glyceride (of structure (A) above) having, on an average about two fumaryloxy groups per molecule, which has been prepared by reacting 0.8 mole methylamyl half-ester of fumaric acid, 1 equivalent of soybean oil and 1 mole of tertiary butyl hpyochlorite together followed by the removal of tertiary butyl alcohol, does not exotherm when polymerized with styrene at elevated temperatures (e.g. 85° C.) in the presence of conventional free radical polymerization catalyst systems (e.g. benzoyl peroxide, acetyl peroxide). In fact, the internal temperature of the polymerization system is not more than 10° C. higher than the external temperature. On the other hand, this same methylamyl fumaryloxy-halo syobean oil will copolymerize with styrene using a catalyst system comprising methyl ethyl ketone peroxide, cobalt naphthenate and dimethyl aniline at room temperature or isothermally. While the initial rate of polymerization is quite rapid and very exothermic, the system reaches its peak exotherm prior to gelation of the copolymer and the rate of polymerization drops off rapidly. The gelled resin remains soft for several hours after gelation. The room temperature or the isothermal copolymerization of the fumaryloxy-halo compounds with styrene is atypical since styrene-fumarate systems usually exhibit little or no exotherm prior to gelation and then exhibit a high exotherm after gelation. Typical styrene-fumarate copolymers usually set up rapidly after gelation.

Various other copolymerization rate studies have been carried out on the following types of polymerizable compositions:

(1) Monoalkyl ester of fumaric acid and styrene
(2) Monoalkyl ester of fumaric acid, glyceride oil and styrene
(3) Monoalkyl ester of fumaric acid, styrene and alcohol stripped reaction products of alkyl hypohalite and glyceride oil
(4) Vicinal chloro-fumaryloxy compounds and styrene in the absence of any allylic-chloro groups.

Compositions falling within types 1, 2 and 4 all copolymerize in the conventional styrene-fumarate manner while compositions falling within type 3 are inhibited. All of these studies confirm the fact that the inhibition is caused by the allylic-halo material.

This inhibition of vicinal acryloxy-halo long-chain compounds having a carboxyl group esterified with a monohydroxy compound on the beta carbon atom of the acryloxy group (e.g., fumaryloxy and maleyloxy) is quite serious since the compounds based on fumaric acid half-esters and maleic acid half-esters are the least expensive and most versatile. The physical properties of copolymers based on these monomers can be changed readily and inexpensively by merely changing the monohydroxy compound with which the alpha,beta-ethylenically unsaturated alpha,beta-dicarboxylic acid is esterified. This is explained in detail in application Ser. No. 167,154, now U.S. Patent 3,304,315. The fumarates are, in general, preferred because of their decidedly faster rate of copolymerization. Although the vicinal halo-acryloxy compound can be separated from allylic-halo containing by-products, this is generally not economically practical when a monoethylenically unsaturated fatty material is employed. When a polyethylenically unsaturated fatty material is employed, such as one of the preferred glyceride oils, separation is generally not possible since the by-product allylic-halo group will usually be found in a molecule which also contains the desired acryloxy-halo group.

The above described vicinal acryloxy-halo long-chain fatty compounds, even those of high molecular weight, such as those based on the glyceride oils, are quite fluid and have relatively low viscosity when compounded with a copolymerizable monomer, such as styrene or vinyl toluene. These physical properties are advantageous in many cases, e.g. where the composition is to be pumped to the place of in situ polymerization. However, the low viscosity permits filler to settle out of highly filled polymerizable compositions. This high fluidity, or low viscosity, is also undesirable in some forms of lay-up molding.

The principal object of this invention is to provide a new series of polymerizable vicinal acyloxy-halo long chain compounds.

Another important object of this invention is to prepare vicinal halo-fumaryloxy long chain fatty compounds, which copolymerize with monovinyl aromatics (particularly styrene), in a more typical fumarate-styrene manner, e.g. the polymerization mass gels before the polymerizing material reaches its peak exotherm.

A further object of this invention is to prepare more viscous, acryloxy-halo long chain fatty compounds of higher molecular weight.

In one aspect, this invention is a process which comprises reacting a long-chain fatty ethylenically unsaturated compound with (I) hypohalite and an acid acrylic compound and (II) hypohalite and an ester of polyhydroxy component and dicarboxylic acid component wherein said ester has on an average (1) at least one free carboxyl group, (2) at least two intra-ester linkages in the ester chain and (3) a molecular weight of at least 206.

In a second aspect, this invention is a process which comprises reacting a long-chain ethylenically unsaturated compound with tertiary alkyl hypochlorite and a mixture of an acid acrylic compound and an ester of polyhydroxy component and dicarboxylic acid component wherein said ester has on an average (1) at least one free carboxyl group, (2) at least two intra-ester linkages in the ester chain and (3) a molecular weight of at least 206.

In third aspect, this invention is a process which comprises reacting a long-chain ethylenically unsaturated compound with hypohalite and an ester of polyhydroxy component and dicarboxylic acid component, wherein said ester has on an average (1) at least one free carboxyl group, (2) at least one alpha,beta-ethylenically unsaturated alpha,beta-dicarboxylic acid moiety, (3) at least two intra-ester linkages in the ester chain and (4) a molecular weight of at least 206.

In a fourth aspect, this invention is a process which comprises reacting maleic anhydride with a monohydroxy compound and a polyhydroxy compound to form maleic acid half-esters, isomerizing said maleic acid half-esters to form fumaric acid half-esters, and then reacting said fumaric acid half-esters with a tertiary alkyl hypochlorite and a long-chain ethylenically unsaturated fatty compound.

In a fifth aspect, this invention is a process which comprises reacting maleic anhydride with a polyhydroxy compound to form maleic acid half-esters, isomerizing said maleic acid half-esters to form fumaric acid half-esters, and then reacting said fumaric acid half-esters with a tertiary alkyl hypochlorite and a long-chain ethylenically unsaturated fatty compound.

In another aspect, this invention is a polymerizable compound having the structure

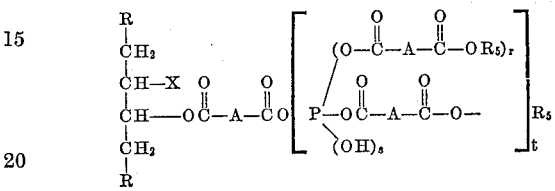

wherein

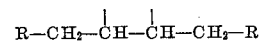

is an aliphatic open chain of from 10–24 carbon atoms; R is hydrogen or a monovalent aliphatic group; A is a divalent hydrocarbon group or halogen substituted hydrocarbon group; at least one A has the structure

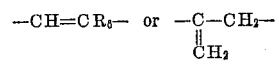

wherein $R_6$ is hydrogen, alkyl of from 1–4 carbon atoms or halogen; P is the residue of a hydroxyl compound, r is a number ranging from 0 to 4, s is a number ranging from 0 to 4, the sum of $r+s+2$ is 2 to 6 the number of hydroxyl groups in the original hydroxyl compound, $R_5$ is a monovalent aliphatic group, a monovalent aromatic group or hydrogen; and t is a number ranging from 1 to 10.

We have now found that we can accomplish the objects of our invention either by haloacylating a long-chain ethylenically unsaturated compound with an acid acrylic compound and an ester of polyhydroxy component and dicarboxylic acid component wherein said ester has on an average (1) at least one free carboxyl group, (2) at least two intra-ester linkages in the ester chain and (3) a molecular weight of at least 206 or by haloacylating a long-chain ethylenically unsaturated compound with an ester of polyhydroxy component and dicarboxylic acid component, wherein said ester has on an average (1) at least one free carboxyl group, (2) at least one alpha,beta-ethylenically unsaturated dicarboxylic acid moiety, (3) at least two intra-ester linkages in the ester chain and (4) a molecular weight of at least 206.

THE REACTANTS

The hypohalite reactant

While various alkyl hypohalites can be used in the instant invention for the haloacylation reaction, tertiary alkyl hypohalites, such as tertiary butyl hypochloride and tertiary amyl hypochlorite, are preferred, since they are considerably more stable than the normal and secondary alkyl hypohalites. For example, tertiary butyl hypochlorite can be distilled at about 79° C.; or further, even without distillation, it can be stored (in the dark) at room temperature for months without decomposing. Further, the large size of the tertiary alkyl group sterically hinders the addition of the alkoxy group to the positive carbonium ion, which is formed by the addition of halogen to the ethylenic double bond of the long-chain fatty compound. Tertiary butyl hypochlorite is particularly advantageous because it can be produced easily and inexpensively.

In situ-generated hypohalites, which are formed by the reaction of aqueous alkali (NaOH, for example) and diatomic halogen ($Cl_2$, for example), are not as desirable as the alkyl hypohalites, since higher yields of the desired products are obtained with the alkyl hypohalites. Further, the aqueous medium, which is necessary for the use of in situ-generated hypohalite, must be removed prior to the use of the desired product. This dewatering is often complicated by the formation of hard-to-break emulsions.

The long-chain unsaturated reactant

In somewhat greater detail, the monovalent aliphatic group R of the long-chain ethylenically unsaturated compound can contain various other groups such as hydroxyl groups, carboxyl groups, carboxylate groups, carbamyl groups, amino groups, nitrilo groups, carbamato groups, halo groups, acyloxy groups, mercapto groups, alkoxy groups, aryloxy groups, etc. The preferred long-chain ethylenically unsaturated compounds of this invention are the readily available, naturally occurring glyceride oils (which are considered as having carboxylate groups), such as soybean oil, corn oil, cottonseed oil, hempseed oil, tung oil, safflower oil, peanut oil, linseed oil, tobacco seed oil, cod oil, herring (or menhaden) oil, castor oil, etc. Esters of other unsaturated long-chain acids are also advantageous as starting materials, such as the 2-ethyl-hexyl ester of linoleic acid, various esters of tall oil fatty acids, etc. The glycerides and other esters generally are stable in the reaction of this invention although small proportions of secondary products (other than those previously mentioned) may be produced during the reaction in accordance with this invention.

On the other hand, the presence of groups in the long-chain aliphatic compound that are reactive with the hypohalite, such as nitrilo or amino groups, or that are reactive with the carbonium ion formed during the haloacylation, such as hydroxyl or carboxyl groups, can lead to other side reactions during the haloacylation reaction. In our experiments, we have found that any side-reaction products of this type are compatible with the main reaction products and polymers thereof. In some cases where inexpensive polyunsaturated acids, such as tall oil fatty acids and by-product acidulated soapstock formed in the refining of glyceride oils, are employed these side reactions advantageously build up the molecular weight of the final acyloxy-halo polymerizable material.

The following are representative of other ethylenically unsaturated compounds, which can be used in this invention: 4-decene; 9-octadecene; 9-tetracosene; 10-hydroxydecene-2; 1-hydroxyoctadecene-9; 6-hydroxytetracosene-9; 1-chlorodecene-4; 1 - bromoctadecene-9; 1-chlorotetracosene - 9; 1 - nitrilodecene - 4; 1-nitriloocta-decene - 9; 1 - nitrilotetracosene-9; 1 - aminodecene-4; 1-methylaminooctadecene - 9; 1-dioctylaminotetracosene-9; 1-carbamyldecene-4; N-ethyl-1-carbamyloctadecene-9; N-dioctyl-1-carbamyltetracosene-9; 10 - carboxydecene - 2; oleic acid; ricinoleic acid; linoleic acid; linolenic acid; 1-acetoxydecene-4; 1-phenoxyoctadecene-9; 1-propoxyocta-decene-9; etc.

When R in the preceding formula is substituted by a carboxylate group, the substitutent can be represented by the formula:

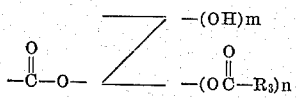

wherein Z is the residue of a hydroxyl compound, $m$ is a number ranging from 0 to 5, $n$ is a number ranging from 0 to 5, the sum of $m$ and $n+1$ is 1 to 6, the number of hydroxyl groups in the original hydroxyl compound, and each $R_4$ is independently a group selected from the class consisting of hydrogen, monovalent aliphatic groups having from 1 to 24 carbon atoms and monovalent aromatic groups having from 6 to 18 carbon atoms.

The alcohols from which Z in the preceding formula may be derived can contain from 1 to 6 hydroxyl groups and from 1 to 24 carbon atoms. They can be saturated or ethylenically unsaturated. They may be open chain compounds such as n-butanol, glycerol, and sorbitol, or cyclic compounds such as furfuryl alcohols, cyclohexanol, cyclohexane-1,4-dimethanol, methyl glucoside and inositol. Among the suitable alcohols for this purpose are the monohydric alcohols ranging from methyl to lignoceryl, including the isomers in which the hydroxyl groups may be primary, secondary or tertiary. Among the many suitable dihydric alcohols are ethylene glycol, trimethylene glycol, and the polyoxyalkylene glycols in which the oxyalkylene groups have 1 to 3 carbon atoms, i.e., the polymethylene glycols, the polyethylene glycols and the polypropylene glycols. Additional suitable higher polyhydric alcohols are pentaerythritol, arabitol, mannitol, trimethylol propane, trimethylol ethane, trimethylol methane, triethanol amine, etc.

Suitable esters may also be obtained from aromatic hydroxy compounds such as phenol, the cresols, resorcinol, hydroquinone, naphthol, etc.

Included in the present invention are those compounds wherein the ester consists of a polyhydric alcohol only partially esterified with a long-chain carboxylic acid, e.g. monoglycerides and diglycerides. Also included in the invention are esters of a polyhydric alcohol, acylated in part by saturated acids. For example, the glyceryl hydroxy groups in the foregoing monoglycerides and diglycerides may be esterified with acids such as acetic acid, benzoic acid, stearic acid, etc.

Ester of polyhydroxy component and dicarboxylic acid component

As pointed out above, the esters of polyhydroxy component and dicarboxylic acid component which are referred to herein as the bridging ester have on an average (1) at least one free carboxyl group, (2) at least two intra-ester linkages in the ester chain and (3) a molecular weight of at least 206. Bridging esters of this invention can be represented by the structure

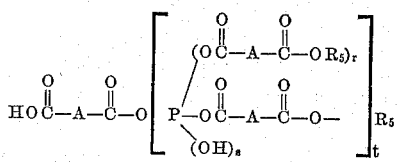

wherein A is a divalent hydrocarbon group (an alkylene group, an arylene group, cycloalkylene group, etc.) a halogen substituted hydrocarbon group; P is the residue of a polyhydroxyl compound, $r$ is a number ranging from 0 to 4, $s$ is a number ranging from 0 to 4, the sum of $r$ and $s+2$ is 2 to 6, the number of hydroxyl groups in the original hydroxyl compound; $R_5$ is a monovalent aliphatic group of from 1 to 24 carbon atoms, a monovalent aromatic group of from 6 to 24 carbon atoms or hydrogen; and $t$ is a number ranging from 1 to 10.

The organic polyhydroxy component, of which P represents the residue, include dihydric alcohols (and anhydrides thereof) such as ethylene glycol (and ethylene oxide), 1,2-propylene glycol, trimethylene glycol and the polyoxyalkylene glycols in which the oxyalkylene groups have 1 to 3 carbon atoms, i.e. the polymethylene glycols, the polyethylene glycols and the polypropylene glycols. Additional polyhydroxy compounds include glycerol, (and glycidol), trimethylol propane, trimethylol ethane, 1,2,6-hexanetriol, triethanol amine, pentaerythritol, arabitol, mannitol, sorbitol, p-cyclohexane - 1,4 - dimethanol, methyl glucoside, sorbitol, inositol, hydrogenated bisphenol A, resorcinol, hydroquinone, etc.

While a wide range of choice is available for the selection of the polyhydroxy component, we have found that vicinal acyloxy-halo long-chain compounds based on cycloaliphatic and aromatic polyhydroxy compounds (preferably hydrogenated bisphenol A and cyclohexane-1, 4-dimethanol), copolymerize with styrene to yield the hardest, most rigid products. Aromatic ring compounds, such as bisphenol A and resorcinol, must be used with care since aromatic compounds having a free OH group bonded directly to the aromatic ring tend to inhibit subsequent copolymerization. In general, aliphatic polyhydroxy compounds yield more flexible products. However, propylene glycol and ethylene glycol can be used advantageously to prepare rigid or flexible products by suitably adjusting the mole ratio of reactants and the particular reactants.

$R_5$ in the above formula is a residue of a hydroxy compound that can be an aliphatic chain of from 1 to 24 carbon atoms such as methanol, ethanol, isopropanol, tetracosanol, benzyl alcohol, tetrahydrofurfuryl alcohol, castor oil, methyl ricinoleate, etc., or aromatic hydroxy compounds having from 6 to 24 carbon atoms such as phenol, p-cresol, p-stearylphenol, etc. However, it is preferred that on an average at least 75% of the above-defined bridging esters contain at least one $R_5$ group which is hydrogen. In general, the higher the concentration of $R_5$ groups which are hydrogen, the higher is the average molecular weight of the long-chain halo-acyloxy compound of the invention.

Suitable dicarboxylic acid components, which are represented by the structure

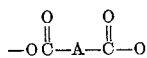

include dicarboxylic acids and anhydrides thereof, such as maleic acid, maleic anhydride, fumaric acid, citraconic acid, citraconic anhydride, mesaconic acid, chloromaleic acid, itaconic acid, itaconic anhydride, succinic acid, succinic anhydride, glutaric acid, glutaric anhydride, adipic acid, sebacic acid, phthalic acid, phthalic anhydride, tetrahydrophthalic acid, tetrahydrophthalic anhydride, tetrachlorophthalic acid, tetrachlorophthalic anhydride, etc.

The bridging esters fall into two distinct types. On the one hand there are the esters based on alpha, beta-ethylenically unsaturated dicarboxylic acid acids such as maleic acid, fumaric acid and itaconic acid. On the other hand, there are the esters based on dicarboxylic acids having no readily addition-polymerizable groups, i.e. no alpha, beta-ethylenic unsaturation or no non-benzenoid unsaturation. The former can be used as the sole acylating material in the haloacylation reaction while the latter must be used in conjunction with an acid acrylic compound in order to introduce the necessary polymerizable groups.

The preferred bridging esters are based upon alpha, beta-ethylenically unsaturated dicarboxylic acids, particularly the alpha, beta-ethylenically unsaturated alpha, beta-dicarboxylic acids (fumaric and maleic acids). These esters are represented by the above formula when at least one A and preferably more than one A has the structure

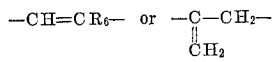

wherein $R_6$ is hydrogen, an alkyl group of from 1-4 carbon atoms or halogen.

In general, these preferred esters contain on an average at least 1.5 alpha, beta-ethylenically unsaturated moieties per molecule. A typical glycol (diethylene glycol) di(hydrogen fumarate) reacts with long chain ethylenically unsaturated fatty compounds in the following manner.

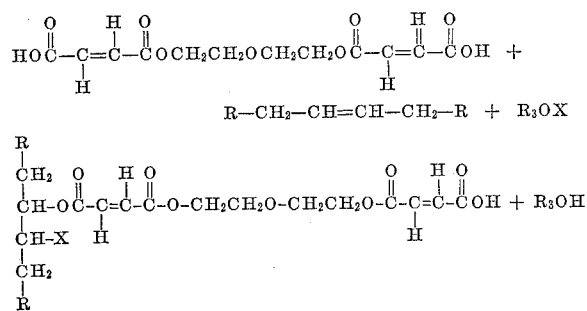

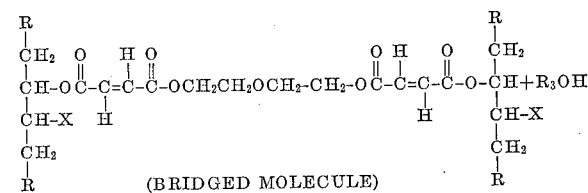

(BRIDGED MOLECULE)

The distribution of bridged and non-bridged long chain fatty molecules is dependent upon the reactants and concentrations thereof.

Other things being equal, the preferred esters yield products having higher average molecular weight and higher viscosities than the acid acrylic compounds described in Ser. Nos. 167,153, now U.S. Patent 3,255,133 and 167,154, now U.S. Patent 3,304,315. This higher molecular weight is due to the generally higher molecular weight of the preferred esters and to the bridging of two or more fatty molecules. Further, the preferred esters permit the introduction of a much larger number of polymerizable groups into each fatty molecule than the acid acrylic compounds described in Ser. Nos. 167,153, now U.S. Patent 3,255,133 and 167,154, now U.S. Patent 3,304,315. For example, the acid acrylic compounds described in Ser. Nos. 167,153, now U.S. Patent 3,255,133 and 167,154, now U.S. Patent 3,304,315 permit the introduction of only one readily polymerizable group into a mono-ethylenically unsaturated long chain fatty compound, such as methyl oleate, while the above illustrative diethylene glycol di(hydrogen fumarate) permits the introduction of two polymerizable groups into methyl oleate. The former copolymerizes with styrene or other monovinylidene compounds to form thermoplastic materials while the latter copolymerizes with monovinylidene compounds to form thermoset materials. In general, the cure time of the polymerizable materials of this invention decreases as the average molecular weight of the polymerizable material increases and as the number of polymerizable groups per molecule increases.

*Preparation of esters of polyhydroxy component and dicarboxylic acid component*

These esters can be prepared by a wide variety of well known esterification techniques. In these reactions, the ratio of equivalents of polyhydroxy component and dicarboxylic acid component is selected in such a manner to yield esters of high acid number and low hydroxyl number. Various esterification catalysts, such as $BF_3$, p-toluene sulfonic acid, etc., can be used to catalyze the esterification reaction.

The preferred method of preparing these compounds particularly the compounds having a high proportion of $R_5$ groups which are hydrogen) from a processing point of view comprises reacting polyhydroxy compound with cyclic anhydride of a dicarboxylic acid. Usually, the carboxyl groups of these cyclic dicarboxylic acid anhydrides are separated by a chain of 2 or 3 carbon atoms.

When the carboxyl groups of a dicarboxylic acid anhydride are separated by a chain of 4 or more carbon atoms, the dicarboxylic acid anhydride normally has a linear configuration. The cyclic anhydrides are preferred since they react with polyhydroxy compounds in an orderly manner to form the desired esters in high yields. For example, 2 moles of maleic anhydride reacts in the absence of an esterification catalyst with 1 mole of glycol to yield almost exclusively a glycol di(hydrogen maleate). Other things being equal, a linear anhydride, such as linear adipic anhydride, reacts with a glycol to yield the desired glycol di(hydrogen adipate) but the reaction product contains a relatively high concentration of free adipic acid, glycol mono(hydrogen adipate), etc. Suitable cyclic anhydrides include maleic anhydride, citraconic anhydride, itaconic anhydride, succinic anhydride, glutaric anhydride, phthalic anhydride, tetrahydrophthalic anhydride, tetrachlorophthalic anhydride, etc. Of these, maleic anhydride and itaconic anhydride are preferred because of the reactivity of of their alpha, beta-ethylenically unsaturated group and relatively low cost.

These esters can be prepared by reacting the polyhydroxy compound with the cyclic anhydride at a temperature of from about 20° C. to 200° C. However, it is usually preferable to carry out this reaction at moderately elevated temperatures (e.g. 80° C. to 150° C.) in order to get a rapid almost quantitative reaction and to suppress undesirable side reactions. As the reaction temperature increases, the possibility of side reactions increases. Generally, in this reaction, it is advisable to avoid the use of conventional esterification catalysts since they tend to promote side reactions.

When a cyclic anhydride is reacted with a polyhydroxy compound under the preferred reaction conditions, approximately one mole (0.9 to 1.1 mole) of cyclic anhydride is reacted per each hydroxyl equivalent in the reaction mixture. Considerably lower concentrations of cyclic anhydride can be employed where a polyhydroxy compound containing three or more hydroxyl groups is employed.

Of all the long-chain fatty products of this invention, those containing fumarate moieties are preferred, since the fumarate group is a considerably more reactive polymerizable group than the maleate or the itaconate group. While fumaric acid does not have an anhydride form which permits the direct preparation of its ester from an anhydride, this is not a serious obstacle to the preparation of the fumarate products. The fumaric acid esters can be prepared easily and in high yields by reacting maleic anhydride with polyhydroxy compound and then isomerizing the maleic acid ester to the comparable fumaric acid ester. The isomerization step can be carried out by heating the maleic acid ester to a temperature of from about 50° C. to 150° C. in the presence of an isomerization catalyst. At temperatures as low as 80 to 110° C., the isomerization is complete in from about 5 to 60 minutes.

The following compounds can be used as isomerization catalysts: phosphorus oxychloride, phosphorus trichloride, thionyl chloride, phosphorus oxybromide, phosphorus oxyiodide, phosphorus oxyfluoride, phosphorus tribromide, phosphorus triiodide, phosphorus trifluoride, 2-ethylhexyl phosphoryl dichloride, di-(2-ethylhexyl) phosphoryl monochloride, phosphorus thiobromide, phosphorus thiochloride, thionyl bromide, thionyl fluoride, hexadecane sulfone chloride, toluene sulfone chloride, chlorosulfonic acid, sulfur monobromide, sulfur monochloride, sulfur dichloride, sulfuryl chloride, iodine, bromine, aluminum chloride, diethyl amine, sulfur dioxide, zinc hydrosulfite, etc. These catalysts can be used in an amount equal to from 0.0001 mole to 0.1 mole per equivalent of maleic acid moieties. Larger concentrations only increase the cost of the product without assisting the reaction. Thionyl chloride, aluminum chloride, phosphorus trichloride and phosphorus oxychloride are the preferred catalysts because of their availability and efficiency.

In some cases, the isomerization step can be carried out by heating the maleic acid ester at a temperature of from about 140° C. to 220° C. in the absence of an isomerization catalyst. However, it is usually preferable to use an isomerization catalyst. At temperatures, which permit a commercially practical rate of isomerization (180°–220° C.) undesirable side reactions are prevalent. However, the choice of the best conditions for isomerizing the maleate moieties of each bridging ester depends upon the structure of the whole molecule. For example, PCl₃ is one of the preferred isomerization catalysts and isomerizes most maleate esters quantitatively to fumarate in about 10 to 15 minutes at 110° C. However, PCl₃ isomerizes only about 40–60% of the maleate moieties in propylene glycol di(hydrogen maleate) in one hour at this temperature. On the other hand, at 150° C., where the rate of isomerization for other maleate esters is usually impractically slow, this same propylene glycol di(hydrogen maleate) is isomerized readily in about 30 minutes in the absence of a catalyst.

If desired, the presence of free fumaric acid or unreacted maleic anhydride can be minimized by reacting somewhat less than 1 mole of (0.9 to 0.995 mole) maleic anhydride per each equivalent of hydroxy compound, and/or after isomerization, reacting with a small concentration of an alkylene oxide, such as ethylene oxide, propylene oxide, butylene oxide, etc.

When desired, it is possible to isomerize the maleate groups to fumarate groups after the haloacylation reaction. In such cases, heat alone (180° C.–220° C. or higher) or heat and an isomerization catalyst may be employed. However, it is usually preferable to isomerize before the haloacylation step since the isomerization is considerably faster when carried out before the haloacylation step. Further, monomers whose maleate groups were isomerized before the haloacylation step copolymerize with vinylidene compounds to form materials of higher tensile strength than corresponding copolymerization products of monomers isomerized after haloacylation.

Cyclic dicarboxylic acid anhydrides can also be used advantageously to prepare ester intermediates which cannot bridge two or more fatty molecules. For example, such products are formed by reacting in sequence about 1 mole of anhydride (maleic anhydride), 1 mole of monohydroxy compound (isopropyl alcohol), 1 mole alkylene oxide (propylene oxide) and 1 mole of anhydride (maleic anhydride).

*The acid acrylic compound*

Suitable acid acrylic compounds, which can be used in this invention can be represented by the formula $$HO\overset{O}{\underset{\|}{C}}-CR_2=\overset{H}{\underset{|}{C}}-R_1$$

wherein $R_1$ is hydrogen or

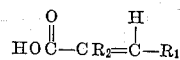

when $R_1$ is hydrogen, $R_2$ is hydrogen, alkyl of from 1 to 4 carbon atoms, alkoxy of from 1 to 4 carbon atoms, halogen, phenyl, benzyl, or

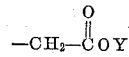

when $R_1$ is

$R_2$ is hydrogen, halogen or alkyl of from 1 to 4 carbon atoms; Y is a monovalent aliphatic chain of from 1 to 24 carbon atoms or an aromatic monovalent radical of from 6 to 24 carbon atoms.

The following compounds are representative of the various acid acrylic compounds, which can be used as acylating agents in this invention: acrylic acid, methacrylic acid, ethacrylic acid, alpha-chloroacrylic acid, alpha-bromoacrylic acid, alpha-iodoacrylic acid, alpha-phenylacrylic acid, alpha-benzylacrylic acid, alpha-propoxyacrylic acid, methyl hydrogen itaconate, methyl hydrogen maleate, methyl hydrogen fumarate, methyl hydrogen mesaconate, methyl hydrogen citraconate, ethyl hydrogen maleate, ethyl hydrogen fumarate, n-propyl hydrogen maleate, isopropyl hydrogen fumarate, n-butyl hydrogen maleate, tertiary-butyl hydrogen fumarate, isoamyl hydrogen fumarate, 4-methyl-2-pentyl hydrogen fumarate, n-octyl hydrogen maleate, 2-ethylhexyl hydrogen fumarate, decyl hydrogen fumarate, lauryl hydrogen maleate, n-tridecyl hydrogen maleate, stearyl hydrogen fumarate, octyldecyl hydrogen maleate, phenyl hydrogen maleate, p-cresyl hydrogen fumarate, benzyl hydrogen maleate, naphthyl hydrogen fumarate, ethyl hydrogen chlorofumarate, cyclohexyl hydrogen maleate, p-chlorophenyl hydrogen maleate, ethoxyethyl (Cellosolve) hydrogen fumarate, p-decylphenyl hydrogen maleate, p-stearyl-phenyl hydrogen maleate, tetracosyl hydrogen fumarate, allyl hydrogen maleate, tetrahydrofurfuryl hydrogen fumarate, etc.

The half-esters of alpha, beta-ethylenically unsaturated dicarboxylic acids and monohydroxy compounds can be prepared in the manner described in application Ser. No. 167,154, now U.S. Patent 3,304,315. For example, equal molar concentrations of monohydroxy compound and cyclic anhydride (maleic anhydride, preferably) can be reacted under moderate reaction conditions (50–150° C.). The maleic acid half-esters can be isomerized to the fumaric acid half-esters using one of the aforementioned isomerization techniques.

However, it is preferable, particularly when a cyclic anhydride is employed, to prepare both the half-esters of alpha, beta-ethylenically unsaturated dicarboxylic acids and the esters of polyhydroxy component at the same time. For example, one mole of maleic anhydride can be reacted with a mixture of 0.5 mole isopropanol and 0.25 mole of diethylene glycol to form a mixture of isopropyl hydrogen maleate and diethylene glycol di(hydrogen maleate). The maleate moieties can be isomerized in the manner described above. In this way, fewer reaction steps and reaction vessels are needed. When mixtures of an alpha, beta-ethylenically unsaturated dicarboxylic anhydride and saturated cyclic anhydride are employed, some of the monohydroxy compound will be converted to half-esters of the saturated dicarboxylic. This reaction product can be employed without purification in the haloacylation reaction.

As pointed out in application Ser. No. 167,154, now U.S. Patent 3,304,315, an important characteristic of the half-esters of the unsubstituted alpha, beta-ethylenically unsaturated alpha, beta-dicarboxylic acids (maleic acid and fumaric acid) is that the properties of the polymerizable products based thereon can be readily and inexpensively varied by selecting the proper monohydroxy compound from which the half-ester is to be made. For example, when the half-ester is based on a lower alcohol, such as isopropanol, copolymerization products of this invention with monomers such as styrene, are more rigid than when the half-ester is based on a higher alcohol, such as 2-ethylhexanol. As a rule, the flexibility of the copolymer increases as the number of carbon atoms in the monohydroxy compound increases. In general, long-chain fatty compounds, which have been haloacylated with a lower alkyl (e.g. isopropyl) half-ester of fumaric acid and ethylene glycol di(hydrogen fumarate), copolymerize with styrene to form more rigid products than the corresponding monomers haloacylated solely with ethylene glycol di(hydrogen fumarate). Generally, aryl half-esters form harder copolymerization products than the corresponding alkyl half-esters.

The concentration of acid acrylic compound and bridging ester is subject to wide variation depending upon the choice of bridging ester and acid acrylic compound. As pointed out above, the preferred class of bridging esters, based on alpha, beta-ethylenically unsaturated dicarboxylic acid components can be used as the sole acylating material or can be used in combinations with the acid acrylic compounds. When used in combination with acid acrylic compounds, the preferred bridging esters, based on alpha, beta-ethylenically unsaturated dicarboxylic acid components, can provide as little as 5 equivalent percent of the free carboxyl containing material, i.e. the acid acrylic compound provides from 0 to 95 equivalent percent of the free-carboxyl-containing acylating compounds.

However, when the bridging ester is based on dicarboxylic acid components having no alpha, beta-ethylenically unsaturated moieties, the bridging ester can provide from about 5 to 50 equivalent percent of the free-carboxyl-containing compounds while the acid acrylic compound provides from about 50 to 95 equivalent percent of the free-carboxyl-containing compounds. Usually this composition is most suitable for use in the haloacylation of polyunsaturated long-chain fatty materials, such as the glyceride oils.

*Method of carrying out haloacylation reaction*

The vicinal halo-acyloxy long-chain compounds of this invention can be prepared by reacting the bridging ester of polyhydroxy component and dicarboxylic acid component with the long-chain ethylenically unsaturated fatty material before, at the same time or after the reaction of the acid acrylic compound with the long-chain ethylenically unsaturated fatty material. Other things being equal, bridging of two or more fatty molecules is maximized by reacting the bridging ester first and minimized by reacting the acid acrylic compound first. However, it is generally more convenient and less time-consuming when both carboxyl-containing reactants are reacted simultaneously with the long-chain ethylenically unsaturated fatty compound. This is particularly true when both carboxyl-containing components are based on alpha, beta-ethylenically unsaturated dicarboxylic acids, as explained above.

Each haloacylation reaction step is carried out by reacting the free-carboxyl-containing material (bridging ester and/or acid acrylic compound), long-chain ethylenically unsaturated compound and hypohalite at a temperature of from about −50° C. to about 150° C. The reaction is strongly exothermic and the reaction mixture, particularly in large scale operations, should be cooled to prevent damaging temperature rise. Useful reaction rates without objectionable product discoloration and without decomposition are obtained in the range of 0° to 100° C. and the preferred range is about 25° to 75° C. At 25° to 75° C., the reaction is substantially complete in 1–5 hours, the vapor pressure of the preferred hypohalite (tertiary butyl hypochlorite) is moderate, product discoloration is nil, and side reactions of the acid acrylic compound with tertiary alkyl hypochlortie is suppressed. Higher reaction temperatures lead to more product discoloration and to problems stemming from higher vapor pressure of the hypochlorite and necessitating the use of pressure vessels. The chief disadvantage of lower temperatures is reduced reaction rate and correspondingly longer reaction time. In the temperature range 0° to 100° C., the reaction is essentially complete in ¼–8 hours. Over the broader temperature range of −50° C. to 150° C., the reaction time will vary from virtually instantaneous reaction to reaction of several weeks' duration.

Generally, when low temperatures are employed or a more rapid reaction desired, an accelerator, such as a tetraalkyl ammonium salt or a tetraalkyl phosphonium salt can be employed. Generally, these accelerators can be employed in a concentration of 0.0001 to 0.1 mole per equivalent of ethylenic unsaturation in the ethylenically unsaturated compound. Tetramethyl ammonium chloride is particularly efficacious.

*Proportions in the haloacylation reaction*

The free carboxyl containing acylating material (acid acrylic compound and bridging ester), hypohalite and long-chain ethylenically unsaturated compound can be present in the reaction mixture in virtually any proportions. However, we prefer to use about one mole of alkyl hypohalite for each equivalent of ethylenic unsaturation in the ethylenically unsaturated compound. A higher proportion of the alkyl hypohalite accelerates the reaction only slightly and may create the inconvenience of having to remove excess hypohalite and/or alcoholic by-products from the reaction product. However, this inconvenience may be compensated for by the reaction product's high viscosity and the increased toughness and/or rigidity of its copolymers. Of course, a lower proportion of alkyl hypohalite reduces the number of ethylenic groups that are haloacylated. Useful products are obtained over the range of about 0.1 to about 3 moles of alkyl hypohalite per equivalent of ethylenic unsaturation.

The proportion of equivalents of free-carboxyl-containing material (bridging ester and/or acid acrylic compound) and equivalents of ethylenic unsaturation in the long chain fatty compound is subject to wide variation.

For example, when it is desirable to haloacylate as many of the ethylenic double bonds in the ethylenically unsaturated compound as possible, the free carboxyl containing compounds should be used in the proportion of about 1.2 to 2 equivalents per equivalent of ethylenic unsaturation in the ethylenically unsaturated compound, and the most effective concentration varies with temperature. At about 45° C., a ratio of 1.7 to 1 is most effective, while at about 65° C., a ratio of 1.35 to 1 is most effective. Of course, the higher the ratio of free carboxyl groups to ethylenically unsaturated groups, the less frequent the incidence of bridged molecules. Compared with results at a 1 to 1 ratio, the higher proportions provide a significantly higher reaction rate and yield of acyloxy-halo compound. Higher ratios than 2 to 1 provide relatively little additional increase in reaction rate and product yield, and this is more than offset by the disadvantage of having to remove a larger amount of unreacted free-carboxyl-containing compounds from the reaction mixture or by the higher cost without corresponding advantage if the free carboxyl containing compounds are left in the composition.

When it is desirable to bridge as many of the ethylenically unsaturated molecules as possible, the free carboxyl containing bridging esters, which preferably contain on an average at least 1.75 free carboxyl groups per molecule, are used alone or together with acid acrylic compounds in a ratio of from about 0.6 to 1.0 equivalent of free carboxyl groups per each equivalent of ethylenic unsaturation in the long chain fatty compound. Generally excess hypohalite promotes bridging with these ratios of free carboxyl groups and ethylenic unsaturation. As pointed out above, bridging is maximized by haloacylating the long chain fatty material first with the bridging ester followed by haloacylating with acid acrylic compound.

A polymerization inhibitor, such as metallic copper, an amine, a phenolic or a quinoid compound, should be present during the haloacylation in the proportion of from about 0.001 to 0.5 weight percent of the reactants when an acid acrylic compound having terminal ethylenic unsaturation is employed as the acylating agent. Preferably, the inhibitor should be used in the proportion of from about 0.01 to 0.1 weight percent of the reactants. Generally, the phenolic compounds are preferred since they have less tendency to produce undesirable color than the amines do; also the amines tend to react with alkyl hypohalites. Further, sufficient phenolic inhibitor is usually present in the commercially available monocarboxylic acids, and in this event it is unnecessary to add additional inhibitor. Acid acrylic compounds having an esterified carboxyl group on the beta carbon atom (e.g. maleic acid half-esters and fumaric acid half-esters) and bridging esters based on these acids or on saturated acids do not require the presence of a polymerization inhibitor unless there is terminal unsaturation in one of the reactants.

*Polymerization*

The physical and chemical characteristics of the novel vicinal acyloxyhalo reaction products contemplated by this invention, and more particularly the polymers and resins derived therefrom, are capable of wide variation by selecting properly the reactants, i.e. the unsaturated compound, bridging ester and the acid acrylic compound, and the extent of acylation. The reaction products of this invention may be polymerized through the ethylenic groups in the acylating acid with known catalysts, either ionic or free radical, with vinylidene compounds to form useful copolymers. Among the other vinylidene monomers with which the acyloxyhalo-compound reaction products of this invention may be copolymerized are methyl methacrylate, ethyl acrylate, butyl methacrylate, stearyl acrylate, acrylic acid, methacrylic acid, styrene, alpha-methyl styrene, allyl alcohol, vinyl acetate, vinyl stearate, vinyl chloride, vinylidene chloride, acrylamide, acrylonitrile, butadiene, etc. The acyloxyhalo products of this invention may also be copolymerized with a wide variety of monomers having internal ethylenic unsaturation, using conventional catalysts and polymerization conditions, to yield useful copolymers. Among such compounds are maleic anhydride, crotonic acid, cinnamic acid, dipentene, myrcene, etc. The copolymers thus produced range from viscous liquids through soft gels to tough rubbery products and hard resins.

The vicinal acyloxy-halo reaction products of this invention can be copolymerized at a temperature of from about 0° C. to 250° C. with any of the aforementioned vinylidene compounds. While the vicinal acyloxy-halo reaction products can comprise from about 2 to 95 parts by weight of the polymerizable monomers, and correspondingly the vinylidene monomers comprise from 5 to 98 parts, it is usually preferable that the acyloxy-halo reaction product comprise from about 30 to 90 weight percent of the polymerizable composition. Preferably a monovinyl aromatic compound having the formula

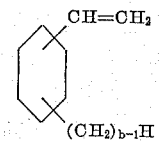

wherein $b$ is a number from 1 to 2, comprises from 10 to 70 parts by weight of the polymerizable composition in order to give the copolymers the best balance between strength and cost. The polymerization can be carried out by reacting the copolymerizable acyloxy-halo reaction product and vinylidene monomer in the presence of a free radical catalyst in bulk, solution, suspension or emulsion. Typical free radical catalysts, which include the peroxidic catalysts, such as hydrogen peroxide, acetyl peroxide, methyl ethyl ketone peroxide, benzoyl peroxide, tertiary butyl hydroperoxide, potassium persulfate, etc., and azo compounds such as azobisisobutyronitrile, etc., can be used in a concentration of from 0.1% to 10% by weight of the monomers. Accelerators (or driers) such as cobalt naphthenate, cobalt octoate, dimethyl aniline, etc., can be used with the various peroxidic catalysts in a concentration of 0.01 to 10.0 parts by weight of the polymerizable composition.

The copolymers are useful broadly as protective coatings, textile and paper additives and sizing agents, laminating resins, potting resins, adhesives, etc. They are also useful in the manufacture of cast and extruded objects. The long fatty chain of the vicinal acyloxy-halo reaction products makes them particularly well suited as internal plasticizers of polymers of monomers such as styrene, vinyl chloride and vinylidene chloride.

The methacryloxy and acryloxy compounds are photosensitive and must be stored in the dark to prevent premature polymerization. In the absence of light, they are stable for months at room temperature. To prevent deterioration because of labile halogen, the stored acyloxy-halo products can contain about 0.05 percent to 5 percent by weight of a stabilizer such as barium-cadmium soap, epoxidized soybean oil, or a tin mercaptide. Virtually any of the stabilizers used for polyvinyl chloride, chlorinated polyethylene or polyolefins prepared with a Ziegler-type catalyst can be incorporated in these products, just so the stabilizer does not prevent their subsequent polymerization.

*Other variations in the process*

While the instant invention is primarily directed to the haloacylation of long chain ethylenically unsaturated compounds, it can also be used to introduce a polymerizable acyloxy group into a wide variety of other ethylenically unsaturated compounds, such as ethylene, propylene, butene-1, butene-2, hexene-1, heptene-3, diisobutylene, nonene-3, octadecene-1, butadiene, isoprene, tetramethylethylene, cyclohexene, cyclooctene, alpha-pinene, styrene, alpha-methyl styrene, p-methyl styrene, o-octyl styrene, 2,5-dichlorostyrene, vinyl chloride, vinyl bromide, allyl chloride, chloroprene, allyl alcohol, diallyl ether of pentaerythritol, vinyl acetate, vinyl propionate, vinyl stearate, methyl acrylate, stearyl methacrylate, acrylic acid, methacrylic acid, acrylonitrile, acrylamide, etc., or even natural rubber. As a general rule, those compounds, which contain an internal ethylenic double bond, such as cyclohexene or nonene-3, can be haloacylated under the same conditions as the preferred long-chain ethylenically unsaturated compounds of this invention. On the other hand, those compounds which contain only terminal unsaturation, such as ethylene and propylene, require temperatures in excess of about 20° C. and/or a haloacylation accelerator (e.g. tetramethyl ammonium chloride) since terminal ethylenic double bonds are somewhat harder to haloacylate than internal ethylenic double bonds. Compounds, such as vinyl chloride and acrylic acid, itself, are still harder to haloacylate because of the presence of electrophilic groups in close association with the ethylenic double bond. Generally, the larger the number of electrophilic groups in close association with the ethylenic double bond, the harder it is to haloacylate the ethylenic double bond; usually these can only be haloacylated with the aid of a haloacylation catalyst at a temperature in excess of about 20° C.

In the above description, considerable emphasis has been placed on the use of the techniques of this invention for the preparation of polymerizable materials and copolymers thereof. However, the techniques disclosed in this invention can be advantageously utilized to prepare a variety of compounds and compositions having no readily polymerizable groups (i.e. a saturated bridging ester is employed and no acid acrylic compound is employed). For example, bridging esters based solely on phthalic anhydride or another saturated dicarboxylic acid component can be reacted with inexpensive mixtures of long chain monoethylenically unsaturated hydrocarbons (or other inexpensive materials) to form a relatively inexpensive new class of nonvolatile plasticizers. These same saturated bridging esters can be reacted with polyunsaturated materials to form useful polyesters under appropriate reaction conditions. Likewise, the saturated bridging esters, which can be of high molecular weight, can be converted to oil modified polyesters by reacting the condensation polymer with glyceride oil and hypohalite.

The following examples are merely illustrative and should not be construed as limiting the scope of the invention. In the examples, "meq." refers to millequivalents.

EXAMPLE I

Eight-tenths of a mole of maleic anhydride (78.4 grams) was weighed into a Morton flask equipped with a stirrer, thermometer, condenser and dropping funnel, and then heated to 110° C. A mixture of 0.5 moles of decyl alcohol (76.0 grams) and 0.15 moles diethylene glycol (15.9 grams) was added slowly over a period of 30 minutes while maintaining the exothermic reaction at 110° C. The reaction mixture was maintained at 110° C. for an additional 30 minutes after the addition of diethylene glycol and decyl alcohol was complete. Fifty-one hundredths of a gram of $PCl_3$ (0.004 mole) was added to the reaction mixture while maintaining the reactants at 110° C. for 10 minutes. Immediately thereafter, 200 grams of soybean oil (1.0 equivalents of ethylenic unsaturation) and 0.026 gram p-methoxyphenol was added to the reaction mixture and the temperature of the reaction mixture was adjusted to 65° C. One hundred and nine grams of 98.5% pure tertiary butyl hypochlorite (1.0 mole) was added to the reaction mixture over a period of 30 minutes, while maintaining the reaction temperature at between 65–70° C. This temperature was maintained until a negative potassium iodide test for hypochlorite was obtained. By-product tertiary butyl alcohol was then removed by reducing the pressure in the reaction vessel to 25 mm. Hg and raising the temperature to 90° C.

Typical vicinal fumaryloxy-chloro soybean products prepared by this technique had the following properties:

| | |
|---|---|
| Acidity _____meq./g__ | 0.61±0.04 |
| t-Butyl alcohol _____ | (1) |
| Total chlorine _____meq./g__ | 2.75±0.03 |
| Allylic chlorine _____meq./g__ | 0.50±0.05 |
| Saponification No. _____ | 7.3±0.1 |
| Moisture _____ | (2) |
| Brookfield viscosity (Model RVF, 20 r.p.m., Spindle #6, 77° F.) _____cps__ | 30,000±4,000 |
| Gardner color, maximum _____ | 10 |
| Clash-Berg $T_4$ (70 parts above material and 30 parts styrene cured with 2 parts benzoyl peroxide paste for 18 hours at 150° F.) _____° C__ | 20±3 |
| Tensile strength of copolymer (70 parts above material and 30 parts styrene) p.s.i__ | 1,200±200 |
| Tensile modulus of elasticity _____p.s.i__ | 30,000 |
| Gel time (70 parts above material, 30 parts styrene, 1 part methyl ethyl ketone peroxide, 1 part cobalt naphthenate, 0.5 part dimethyl aniline, 0.1 part p-benzoquinone) _____minutes__ | 3±0.5 |

[1] Less than 0.5% by weight.
[2] Less than 0.1% by weight.

EXAMPLES II–XVII

A series of vicinal fumaryloxy-chloro soybean oil products was prepared by the method of Example I except that the reactants and proportions thereof were as set forth below in Table I. The distribution of reactants in Table I is based on reaction with 1 equivalent of soybean oil unsaturation. In the Table, DA stands for decyl alcohol, EG stands for ethylene glycol, TEG stands for triethylene glycol, MA stands for maleic anhydride and tBHC stands for tertiary butyl hypochlorite. The Clash Berg $T_4$ in ° C., tensile strength (in p.s.i.) and gel time (in minutes) were all determined in the manner described in Example I on a 70 part fumaryloxy-chloro soybean oil reaction product with 30 parts styrene.

TABLE I

| Example | Distribution of Reactants in Moles | | | | | Acidity, meq./g. | Viscosity in cps. | Clash Berg $T_4$ in ° C. | Tensile Strength in p.s.i. | Gel Time in min. |
|---|---|---|---|---|---|---|---|---|---|---|
| | DA | EG | TEG | MA | tBHC | | | | | |
| II | 0.4 | | 0.2 | 0.8 | 1.2 | 0.43 | 112,000 | 43 | 2,700 | 1.0–1.25 |
| III | 0.5 | 0.25 | | 1.0 | 1.0 | 0.98 | 21,000 | 32 | 1,830 | 4.5–5.00 |
| IV | 0.4 | | 0.2 | 0.8 | 1.0 | 0.63 | 33,400 | 32 | 2,080 | 4.0–4.5 |
| V | 0.3 | 0.15 | | 0.6 | 1.0 | 0.27 | 84,000 | 16 | 1,050 | 3.5–3.75 |
| VI | 0.4 | 0.2 | | 0.8 | 0.8 | 0.87 | 8,400 | 12 | 881 | 9.5–10.0 |
| VII | 0.5 | 0.15 | | 0.8 | 1.2 | 0.43 | 50,400 | 24 | 1,530 | 3.0–3.5 |
| VIII | 0.62 | | 0.19 | 1.0 | 1.0 | 0.95 | 13,000 | 40 | 2,490 | 2.0–2.5 |
| IX | 0.5 | | 0.15 | 0.8 | 1.0 | 0.62 | 19,100 | 28 | 1,890 | 3.0–3.5 |
| X | 0.38 | | 0.11 | 0.6 | 1.0 | 0.28 | 27,800 | 18 | 1,310 | 3.0–3.5 |
| XI | 0.5 | 0.15 | | 0.8 | 0.8 | 0.83 | 5,200 | 3 | 557 | 7.0–7.5 |
| XII | 0.6 | | 0.1 | 0.8 | 1.2 | 0.40 | 24,800 | 16 | 1,090 | 3.25–3.5 |
| XIII | 0.75 | | 0.125 | 1.0 | 1.0 | 0.91 | 8,000 | 34 | 1,980 | 2.5–2.75 |
| XIV | 0.75 | 0.125 | | 1.0 | 1.0 | 0.90 | 7,600 | 25 | 1,340 | 3.25–3.75 |
| XV | 0.6 | | 0.1 | 0.8 | 1.0 | 0.61 | 11,400 | 15 | 1,060 | 3.75–4.25 |
| XVI | 0.45 | 0.075 | | 0.6 | 1.0 | 0.26 | 17,900 | 7 | 662 | 6.0–6.5 |
| XVII | 0.6 | 0.1 | | 0.8 | 0.8 | 0.76 | 5,400 | 1 | 642 | 4.75–5.25 |

Other things being equal, the above data indicates:

(1) As the mole ratio of hypohalite to maleic anhydride increases the acidity of the composition decreases, i.e. there is more efficient utilization of the free carboxyl containing materials.

(2) As the mole ratio of hypohalite to maleic anhydride increases, the viscosity of the reaction product increases.

(3) The gel time of copolymerization products is extended when (a) less than one equivalent of free carboxyl containing material (total of half-ester of acid acrylic compound and bridging ester) is reacted per each equivalent of ethylenic unsaturation and (b) the ratio of moles hypohalite to moles of starting anhydride (ratio of moles of hypohalite to equivalents of free carboxyl groups) is equal to unity or less. However, absent condition (a) or (b) the gel time is not extended.

(4) Products based on triethylene glycol give rise to copolymers having a higher Clash Berg $T_4$ and tensile strength than those based on ethylene glycol.

(5) Absent either or both of factors (a) or (b) listed under 3 above, the tensile strength and Clash Berg $T_4$ of copolymerization products increases as the concentration of bridging ester increases.

EXAMPLE XVIII

One mole of maleic anhydride was weighed into a flask flask equipped with a stirrer, thermometer, condenser and dropping funnel, and then heated to 110° C. A mixture of 0.5 mole isopropyl alcohol and 0.25 mole hydrogenated bisphenol A were added slowly over a period of about 20 minutes while maintaining the exothermic reaction at between 115–130° C. The reaction mixture was maintained at between 115–130° C. for an additional 30 minutes after the addition of isopropyl alcohol and hydrogenated bisphenol A was complete. Five-thousandths of a mole of $PCl_3$ was added to the reaction mixture after the temperature of the reaction mixture was adjusted to 110° C. Ten minutes later, 1 equivalent (ethylenic unsaturation) of linseed oil was added to the reaction mixture and the temperature was adjusted to 65° C. One mole of tertiary butyl hypochlorite was added to the reaction mixture over a period of about 25 minutes, while maintaining the reaction temperature at between 65–70° C. This temperature was maintained until a negative potassium iodide test for hypochlorite was obtained. By-product tertiary butyl alcohol was then removed by reducing the pressure in the reaction vessel to 10 mm. Hg and raising the temperature to 90° C.

Sixty-seven parts of the above vicinal fumaryloxy-chloro linseed oil, 33 parts styrene and 1 part benzoyl peroxide were polymerized at 150° F. for 18 hours. The copolymer had a Clash Berg $T_4$ of 110° C., a flexural modulus of 317,000 p.s.i., Barcol 934 hardness of 28–21, a heat distortion temperature of 94° C. at 66 p.s.i. and a heat distortion temperature of 71° C. at 264 p.s.i.

EXAMPLE XIX

Example XVIII was repeated except that the 1 equivalent of linseed oil was replaced by 1 equivalent (ethylenic unsaturation) of washed, vacuum dried acidulated soap stock, which was a by-product from a soybean oil refinery. A copolymer was prepared from this material in the same manner as in Example XVIII. The copolymer had a Clash Berg $T_4$ of 46° C.

EXAMPLES XX–LII

A series of vicinal fumaryloxy-chloro long chain fatty products were prepared by the method of Example XVIII except that the reactants and proportions were as set forth below in Table II. The significance of the symbols used in this table is as follows:

| Symbol | Meaning | Symbol | Meaning |
|---|---|---|---|
| IA | Isopropyl alcohol | BG | Butene diol. |
| DA | Decyl alcohol | NPG | Neopentyl glycol. |
| MAA | Methylamyl alcohol. | HBPA | Hydrogenated bisphenol A. |
| 2 EHA | 2-ethylhexyl alcohol | CHDM | Cyclohexane-1, 4-dimethanol. |
| THFA | Tetrahydofuryl alcohol. | TME | Trimethylol ethane. |
| EG | Ethylene glycol | PE | Pentaerythritol. |
| DEG | Diethylene glycol | MA | Maleic anhydride. |
| TEG | Triethylene glycol | PA | Phthalic anhydride. |
| CW 400 | Carbowax 400 | THPA | Tetrahydrophthalic anhydride. |
| CW 600 | Carbowax 600 | ASS | Acidulated soap stock. |
| DPG | Dipropylene glycol | SO | Soybean oil. |
| ByG | Butylene glycol | CSO | Unrefined soybean oil containing about 0.4% by weight free fatty acids and 2% by weight phosphatide. |

The Clash Berg $T_4$ of 67 parts chlorofumaryloxy material and 33 parts styrene was determined in the manner set forth in Example XVIII.

TABLE II

| Example | Moles Hydroxy Component | | Mole Anhydride | Mole tBHC | Equivalents Long Chain Fatty Compound | Clash Berg $T_4$ in ° C. |
|---|---|---|---|---|---|---|
| | Mono | Poly | | | | |
| XX | 0.2 IA | 0.2 EG / 0.2 HBPA | 1.0 MA | 1.0 | 1.0 ASS | 69 |
| XXI | 0.2 IA | 0.3 EG / 0.1 HBPA | 1.0 MA | 1.0 | 1.0 ASS | 63 |
| XXII | 0.2 IA | 0.3 TEG / 0.1 HBPA | 1.0 MA | 1.0 | 1.0 ASS | 75 |
| XXIII | 0.2 IA | 0.3 TEG / 0.1 HBPA | 1.0 MA | 1.0 | 1.0 CSO | 77 |
| XXIV | 0.2 IA | 0.3 TEG / 0.1 HBPA | 1.0 MA | 1.0 | 1.0 SO | 72 |
| XXV | 1.0 IA | 0.25 HBPA | 1.5 MA | 1.0 | 1.0 SO | 102 |
| XXVI | 0.8 IA | 0.2 EG / 0.15 HBPA | 1.5 MA | 1.0 | 1.0 SO | 84 |
| XXVII | 0.25 IA | 0.5 DEG | 1.25 MA | 1.0 | 1.0 SO | 80 |
| XXVIII | 0.5 IA | 0.5 ByG | 1.5 MA | 1.0 | 1.0 SO | 90 |
| XXIX | 0.5 IA | 0.5 BG | 1.5 MA | 1.0 | 1.0 SO | 93 |
| XXX | 0.75 IA | 0.25 NPG | 1.25 MA | 1.0 | 1.0 SO | 66 |
| XXXI | | 0.25 NPG / 0.1 HBPA / 0.15 EG | 1.0 MA | 1.0 | 1.0 SO | 72 |
| XXXII | 0.5 IA | 0.125 PE | 1.0 MA | 1.0 | 1.0 SO | 64 |
| XXXIII | 0.5 IA | 0.25 PE | 1.0 MA | 1.0 | 1.0 SO | 46 |
| XXXIV | 0.15 IA | 0.8 EG | 1.75 MA | 1.0 | 1.0 SO | 102 |
| XXXV | | 0.875 EG | 1.75 MA | 1.0 | 1.0 SO | 99 |
| XXXVI | 1.5 IA | 0.25 HBPA | 2.0 MA | 1.0 | 1.0 SO | 97.5 |
| XXXVII | 0.6 IA | 0.3 TME | 1.5 MA | 1.0 | 1.0 SO | 94 |
| XXXVIII | 1.0 IA | 0.25 CHDM | 1.5 MA | 1.0 | 1.0 SO | 97 |
| XXXIX | 0.5 IA | 0.1 TEG / 0.1 PE | 1.0 MA | 1.0 | 1.0 SO | 51 |
| XL | 0.5 IA | 0.1 TME / 0.1 HBPA | 1.0 MA | 1.0 | 1.0 SO | 79.5 |
| XLI | 0.2 THFA | 0.4 TEG | 1.0 MA | 1.0 | 1.0 SO | 27 |
| XLII | 0.6 THFA | 0.2 HBPA | 1.0 MA | 1.0 | 1.0 SO | 43 |

TABLE II—Continued

| Example | Moles Hydroxy Component | | Mole Anhydride | Mole tBHC | Equivalents Long Chain Fatty Compound | Clash Berg $T_4$ in °C. |
|---|---|---|---|---|---|---|
| | Mono | Poly | | | | |
| XLIII | 0.5 IA | 0.5 EG | 0.75 MA / 0.75 PA | 1.0 | 1.0 ASS | 27 |
| XLIV | 1.0 IA | 1.0 EG | 2.0 MA / 1.0 PA | 1.0 | 1.0 CSO | 77 |
| XLV | | 1.0 EG | 1.0 MA / 1.0 PA | 1.0 | 1.0 CSO | 44 |
| XLVI | 0.5 IA | 0.5 EG / 0.3 TME | 1.3 MA / 1.1 PA | 1.0 | 1.0 CSO | 51 |
| XLVII | 0.5 DA | 0.15 CW 600 | 0.8 MA | 1.0 | 1.0 SO | 6 |
| XLVIII * | 0.5 DA | 0.15 CW 400 | 0.8 MA | 1.0 | 1.0 SO | 13 |
| IL * | 0.5 MAA | 0.15 DEG | 0.8 MA | 1.0 | 1.0 SO | 42 |
| L | 0.5 DA | 0.15 DEG | 0.64 MA / 0.16 THPA | 1.0 | 1.0 SO | 10 |
| LI | 0.5 DA | 0.15 DPG | 0.8 MA | 1.0 | 1.0 SO | 31 |
| LII | 0.75 2EHA | 0.25 TEG | 1.0 MA | 1.0 | 1.0 SO | 44 |

* $PCl_3$ was replaced by 0.006 mole $AlCl_3$ as the isomerization catalyst.

EXAMPLE LIII

Example I was repeated except that the concentration of maleic anhydride was reduced to 0.77 mole and 0.06 mole of propylene oxide was added to the reaction mixture 10 minutes after the addition of $PCl_3$. The haloacylation product and styrene copolymers thereof, had essentially the same properties as the product of Example I except that it had an acidity of 0.54 meq./g.

EXAMPLE LIV

One mole of maleic anhydride was reacted with one-half mole of propylene glycol at a temperature of 110° C. to form propylene glycol di(hydrogen maleate) which was isomerized to the fumarate by heating at 150° C. for 30 minutes. One mole of methyl oleate was added to the reaction vessel and cooled to 65° C. Then 1 mole of tertiary butyl hypochlorite was added over a period of 30 minutes while maintaining the exothermic reaction at between 65–70° C. The product was isolated in the manner described in Example I.

Sixty-seven parts of the fumaryloxy-chloro material, 33 parts styrene and 1 part benzoyl peroxide were polymerized at 150° F. for 18 hours to form a semi-rigid adhesive copolymer.

EXAMPLE LV

This example illustrates the preparation of a vicinal maleyloxy-chloro long chain compound based on a bridging ester where $t$ is 3, i.e. on an average said bridging ester contains 4 dicarboxylic acid moieties and 3 glycol moieties. Four moles of maleic anhydride was weighed into a Morton flask equipped with a stirrer, thermometer, condenser having a water separator and dropping funnel and then heated to 110° C. Two moles of ethylene glycol was added slowly over a period of 30 minutes while maintaining the exothermic reaction at 110° C. After the formation of ethylene glycol di(hydrogen maleate) was complete one mole of ethylene glycol and 100 ml. of toluene was added to the reaction vessel. The reaction temperature was maintained at 140° C. until all the toluene and 32.5 ml. of water had been collected in the water separator. Two equivalents (ethylenic unsaturation) of soybean oil was added to the reaction mixture and the temperature was adjusted to 65° C. One and one-half moles of tertiary butyl hypochlorite was added to the reaction mixture over a period of about 25 minutes, while maintaining the reaction temperature at between 65–70° C. The product was isolated in the manner described in Example I.

Sixty-seven parts of the maleyloxy-chloro material, 33 parts styrene and 1 part benzoyl peroxide was polymerized at 150° F. for 18 hours to form a hard, rigid material.

EXAMPLE LVI

A vicinal chloro-fumaryloxy long chain fatty material based on tall oil fatty acids was prepared in the manner described in Example I using 1 mole maleic anhydride, 0.25 mole ethylene glycol, 0.5 mole decyl alcohol, 0.005 mole $PCl_3$, 1 equivalent tall oil fatty acid and 1 mole tertiary butyl hypochlorite.

Ten parts of the vicinal chloro-fumaryloxy material, 30 parts styrene, 60 parts ethyl acrylate and 1 part benzoyl peroxide were polymerized at 150° F. for 18 hours to form a hard, rigid material. An adhesive material was formed by increasing the concentration of the vicinal fumaryloxy-chloro material to 20 parts and decreasing the styrene concentration to 20 parts.

EXAMPLE LVII

A flexible, tacky polymer was prepared by copolymerizing 20 parts of the vicinal fumaryloxy-chloro material of Example III, 40 parts vinyl acetate, 40 parts dibutyl fumarate and 1 part benzoyl peroxide at 150° F. for 18 hours.

EXAMPLE LVIII

A vicinal fumaryloxy-chloro long chain fatty material based on propylene glycol was prepared by the method of Example LIV using 1.75 moles maleic anhydride, 0.875 mole propylene glycol, 1 equivalent of soybean oil and 1.2 moles of tertiary butyl hypochlorite.

Seventy-five parts of the above vicinal fumaryloxy-chloro material, 25 parts 2-ethyl hexyl acrylate and 1 part benzoyl peroxide were polymerized at 150° F. for 18 hours to form a tough, flexible copolymer.

EXAMPLE LIX

This example illustrates the preparation of an acryloxy-chloro long-chain compound based on a saturated bridging ester and methacrylic acid. One-tenth mole of ethylene glycol and 0.2 mole succinic anhydride were reacted at 120° C. for ten minutes forming ethylene glycol di(hydrogen succinate). After the ethylene glycol di(hydrogen succinate) was cooled to 65° C., there was added 1.0 equivalent soybean oil and 0.6 mole methacrylic acid. One mole of tertiary butyl hypochlorite was added to the reaction vessel over a period of 30 minutes, while maintaining the reaction temperature at between 65–70° C. The product was isolated by the method of Example I.

A copolymer of 67 parts of the above vicinal chloro-acyloxy long-chain material and 33 parts styrene had a Clash Berg $T_4$ of 30° C., Heat Distortion Temperature at 66 p.s.i. of 30° C., tensile strength of 1377 p.s.i. and a tensile modulus of 13,700 p.s.i.

Since many embodiments of this invention may be made and since many changes may be made in the embodiments described, the foregoing is to be interpreted as illustrative only and our invention is defined by the claims appended hereafter.

We claim:

1. The method of preparing a long-chain vicinal acyloxy-halo compound, which comprises reacting at −50 to 150° C. a compound having an ethylenically unsaturated open chain of from 10 to 24 carbon atoms with an alkyl hypohalite and an ester having on an average (1) at least one free carboxyl group, (2) at least two intra-ester linkages in the ester chain and (3) a molecular weight of at least 206, wherein all the substituents on said compound having an ethylenically open chain of from 10 to 24 carbon atoms are selected from the group consisting of hydrogen, hydroxyl, carboxylate, carboxyl, carbamyl, amino, nitrilo, carbamato, halo, acyloxy, mercapto, alkoxy and aryloxy.

2. The method of claim 1, wherein the alkyl hypohalite is a tertiary alkyl hypohalite.

3. The method of preparing a polymerizable vicinal acyloxy-halo compound, which comprises reacting at 0° to 100° C. an ethylenically unsaturated compound having the structure R—CH$_2$—CH=CH—CH$_2$—R, wherein

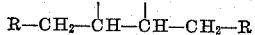

is an open chain of from 10 to 24 carbon atoms, R is selected from the class consisting of hydrogen and a monovalent aliphatic group and all the substituents on said ethylenically unsaturated compound are selected from the group consisting of hydrogen, hydroxyl, carboxylate, carboxyl, carbamyl, amino, nitrilo, carbamato, halo, acyloxy, mercapto, alkoxy and aryloxy, with a composition (I) comprising a tertiary alkyl hypohalite and an acid acrylic compound having the structure

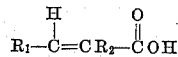

wherein R$_1$ is selected from the class consisting of hydrogen and

when R$_1$ is hydrogen, R$_2$ is selected from the class consisting of hydrogen, alkyl of from 1 to 4 carbon atoms, alkoxy of from 1 to 4 carbon atoms, halogen, phenyl, benzyl and

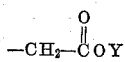

when R$_1$ is

R$_2$ is selected from the class consisting of hydrogen, halogen and alkyl of from 1 to 4 carbon atoms; and Y is selected from the class consisting of a monovalent aliphatic group of from 1 to 24 carbon atoms and a monovalent aromatic group of from 6 to 24 carbon atoms, and a composition (II) comprising a tertiary alkyl hypohalite and an ester having on an average (1) at least one free carboxyl group, (2) at least two intra-ester linkages in the ester chain and (3) a molecular weight of at least 206.

4. The method of claim 3, wherein compositions (I) and (II) are both reacted at the same time with the long-chain ethylenically unsaturated compound.

5. The method of claim 3, wherein the long-chain ethylenically unsaturated compound contains a carboxylate substituent.

6. The method of claim 5, wherein the long-chain ethylenically unsaturated compound comprises a glyceride oil.

7. The method of claim 3, wherein the ester having a molecular weight of at least 206 has the structure

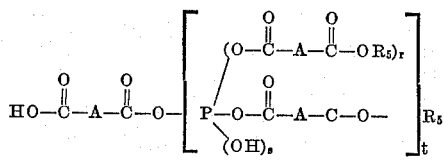

wherein each A is selected from the class consisting of a divalent hydrocarbon group having from 2 to 8 carbon atoms and a divalent halogen substituted hydrocarbon group having from 2 to 8 carbon atoms; P is the radical of a hydroxyl compound, r is a number ranging from 0 to 4, s is a number ranging from 0 to 4, the sum of r+s+2 is 2 to 6, the number of hydroxyl groups in the original hydroxyl compound; each R$_5$ is selected from the class consisting of a monovalent aliphatic group of from 1 to 24 carbon atoms, a monovalent aromatic group of from 6 to 24 carbon atoms and hydrogen, and t is a number ranging from 1 to 10.

8. The method of claim 7, wherein the acid acrylic compound is an alpha,beta-ethylenically unsaturated monocarboxylic acid and all of said

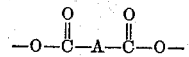

groups are residues of a dicarboxylic acid having no non-benzenoid unsaturation.

9. The method of claim 7, wherein the acid acrylic compound is an alkyl half-ester of an alpha,beta-ethylenically unsaturated dicarboxylic acid and at least one of said

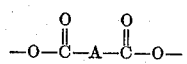

groups is the residue of an alpha,beta-ethylenically unsaturated dicarboxylic acid.

10. The method of preparing a polymerizable vicinal acyloxy-halo compound, which comprises reacting at 0° to 100° C. an ethylenically unsaturated compound having the structure R—CH$_2$—CH=CH—CH$_2$—R$_1$, wherein

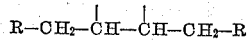

is an open chain of from 10 to 24 carbon atoms, R is selected from the class consisting of hydrogen and a monovalent aliphatic group and all the substituents on said ethylenically unsaturated compound are selected from the group consisting of hydrogen, hydroxyl, carboxylate, carboxyl, carbamyl, amino, nitrilo, carbamato, halo, acyloxy, mercapto, alkoxy and aryloxy, with tertiary alkyl hypochlorite and an ester having on an average (1) at least one free carboxyl group, (2) at least two intra-ester linkages in the ester chain, (3) at least one alpha,beta-ethylenically unsaturated dicarboxylic acid component and (4) a molecular weight of at least 206.

11. The method of claim 10, wherein the tertiary alkyl hypochlorite is tertiary butyl hypochlorite.

12. The method of claim 11, wherein the long-chain ethylenically unsaturated compound contains a carboxylate substituent.

13. The method of claim 12, wherein the long-chain ethylenically unsaturated compound comprises a glyceride oil.

14. The method of claim 11, wherein the long-chain ethylenically unsaturated compound contains a free carboxyl substituent.

15. The method of claim 11, wherein the ester having a molecular weight of at least 206 has the structure

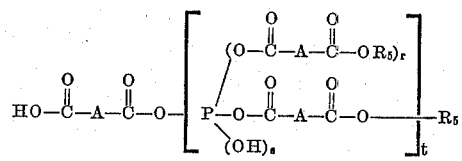

wherein each A is selected from the class consisting of a divalent hydrocarbon group having from 2 to 8 carbon atoms and a divalent halogen substituted hydrocarbon group having from 2 to 8 carbon atoms; P is the radical of a hydroxyl compound, r is a number ranging from 0 to 4, s is a number ranging from 0 to 4, the sum of r+s+2 is 2 to 6, the number of hydroxyl groups in the original hydroxyl compound; each R$_5$ is selected from the class consisting of a monovalent aliphatic group of from 1 to 24 carbon atoms, a monovalent aromatic group of from 6 to 24 carbon atoms and hydrogen; and t is a number ranging from 1 to 10.

16. The method of claim 15, wherein P comprises the radical of ethylene glycol.

17. The method of claim 15, wherein P comprises the radical of diethylene glycol.

18. The method of claim 15, wherein P comprises the radical of triethylene glycol.

19. The method of claim 15, wherein P comprises the radical of 1,2-propylene glycol.

20. The method of claim 15, wherein P comprises the radical of p-p-isopropylidene-dicyclohexanol.

21. The method of claim 15, wherein said long-chain ethylenically unsaturated compound is reacted with an alkyl half-ester of an alpha,beta-ethylenically unsaturated alpha,beta-dicarboxylic acid and tertiary alkyl hypochlorite.

22. The method of clim 21, wherein the alkyl group of said half-ester comprises isopropyl.

23. The method of claim 21, wherein the alkyl group of said half-ester comprises methylamyl.

24. The method of claim 21, wherein the alkyl group of said half-ester comprises 2-ethylhexyl.

25. The method of claim 21, wherein the alkyl group of said half-ester comprises decyl.

26. The method of claim 21, wherein the alkyl group of said half-ester comprises tetrahydrofurfuryl.

27. The method of claim 15, wherein said ester having a molecular weight of at least 206 is prepared by reacting a cyclic anhydride with a polyhydroxy compound.

28. The method of claim 27, wherein said cyclic anhydride comprises maleic anhydride.

29. The method of claim 28, wherein the maleate moieties of said ester are isomerized to fumarate moieties before reaction with said long-chain compound.

30. The method of claim 21, wherein said ester having a molecular weight of at least 206 and said alkyl half-ester of an alpha,beta-ethylenically unsaturated alpha,beta-dicarboxylic acid are prepared together by reacting a cyclic anhydride comprising maleic anhydride with a polyhydroxy compound and a monohydric alcohol.

31. The method of claim 30, wherein the maleate moieties of said esters are isomerized to fumarate moieties before reaction with said long-chain compound.

32. The method of preparing vicinal acyloxy-halo compounds which comprises reacting at —50 to 150° C. an ethylenically unsaturated compound with alkyl hypohalite and an ester having on an average (1) at least one free carboxyl group, (2) at least two intra-ester linkages in the ester chain and (3) a molecular weight of at least 206, and all the substituents on said ethylenically unsaturated compound are selected from the group consisting of hydrogen, hydroxyl, carboxylate, carboxyl, carbamyl, amino, nitrilo, carbamato, halo, acyloxy, mercapto, alkoxy and aryloxy.

33. A vicinal aryloxy-halo compound having the structure

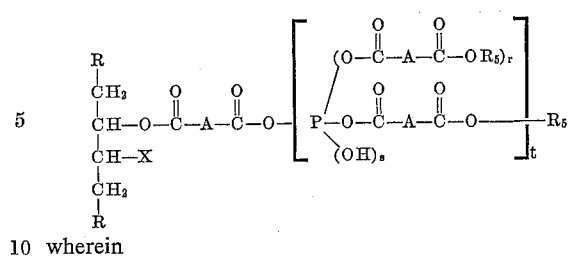

wherein

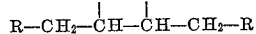

is an aliphatic open chain of from 10 to 24 carbon atoms, R is selected from the class consisting of hydrogen and a monovalent aliphatic group and all the substituents on said monovalent aliphatic group are selected from the group consisting of hydrogen, hydroxyl, carboxylate, carboxyl, carbamyl, amino, nitrilo, carbamato, halo, acyloxy, mercapto, alkoxy and aryloxy; each A is selected from the class consisting of divalent hydrocarbon groups of 2 to 8 carbon atoms and divalent halogen substituted hydrocarbon groups of from 2 to 8 carbon atoms; P is the radical of a hydroxyl compound, $r$ is a number ranging from 0 to 4, $s$ is a number ranging from 0 to 4, the sum of $r+s+2$ is 2 to 6 the number of hydroxyl groups in the original hydroxyl compound; each $R_5$ is selected from the class consisting of a monovalent aliphatic group of 1 to 24 carbon atoms, a monovalent aromatic group of 6 to 24 carbon atoms and hydrogen; $t$ is a number ranging from 1 to 10 and X is halogen.

34. The compound of claim 33 wherein at least one of said

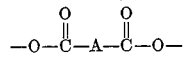

groups is the residue of an alpha,beta-ethylenically unsaturated dicarboxylic acid.

35. The compound of claim 34, wherein one of the R groups of

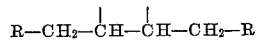

contains a carboxylate group.

36. The compound of claim 35, wherein

comprises a glyceride oil.

37. The compound of claim 36, wherein the glyceride oil comprises soybean oil.

38. The compound of claim 34, wherein at least one of said

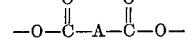

groups is the residue of fumaric acid.

No references cited.

NICHOLAS S. RIZZO, *Primary Examiner.*